United States Patent Office 3,108,130
Patented Oct. 22, 1963

3,108,130
PROCESS FOR THE PREPARATION OF CHLORINATED PHTHALODINITRILES BY CATALYTIC VAPOR-PHASE CHLORINATION OF PHTHALODINITRILES
Atsushi Haga, Hiratsuka-shi, and Shigeru Saito, Tokyo-to, Japan, assignors to Sanko Kagaku Kogyo Kabushiki Kaisha, Tokyo-to, Japan, a joint-stock company of Japan
No Drawing. Filed Aug. 19, 1959, Ser. No. 834,638
5 Claims. (Cl. 260—465)

This invention relates to the production of chlorinated phthalodinitriles, and more particularly it relates to a new and improved method for the production of chlorinated phthalodinitriles of high quality.

It is an object of this invention to provide a new and improved process for the chlorination of phthalodinitriles whereby to produce, in an easy manner and with high yield, chlorinated phthalodinitriles of high quality.

The conventional method of producing chlorinated phthalocyanines, which are well known as organic pigment materials, has been that of liquid-phase chlorination of phthalocyanines with trichlorobenzene, carbon tetrachloride, phthalic anhydride, molten eutectic mixture of anhydrous aluminum chloride and sodium chloride, etc., as the solvent and with such catalysts as antimony pentachloride, phosphorous trichloride, etc. (for example: Research report by P. A. Barrett, Journal of Chemical Society, 1820–1828 (1939)); or it has been that of heating chlorinated phthalic or chlorinated phthalic derivatives, with such liquids as nitrobenzene as the solvent, together with such substances as urea, mineral salts, and ammonium molybdate (for example: Sandoz, British Patent No. 585,727). The present inventors had previously discovered that when phthalocyanines are synthesized with chlorinated phthalodinitriles having two nitrile groups in the o-position of the benzene nucleus and having one to four chlorine atoms retained in the benzene nucleus, chlorinated phthalocyanines can be obtained far more easily and with higher yields as compared with the aforementioned production methods.

Hitherto, research such as that for the attainment of the object of this invention has been conducted (for example, P.B. Report No. 17658, p. 1794), but all of these studies have depended on batch processes in which phthalodinitriles are either melted or dissolved in a solvent, chlorination catalysts added or not added, and chlorine passed through the batch under the liquid-phase condition, and all of these processes have been unsuccessful, with almost no formation of the chlorinated substances sought. As a result of the present inventors' intensive studies on the direct, liquid-phase chlorination of phthalodinitrile method, it was discovered that, because the starting material phthalodinitrile and the chlorinated phthalodinitrile products have considerably strong sublimation characteristics, the liquid-phase chlorination reaction in a smooth manner is difficult. It was learned, furthermore, that the starting material phthalodinitrile and chlorinated phthalodinitrile products have such disadvantages as that, if they are heated for a long time in the liquid-phase conditions, substances in tar form or polymerized condensation products are readily formed. The conclusion was that the liquid-phase chlorination of phthalodinitriles is essentially a very difficult undertaking. These are the reasons why the research works undertaken hitherto have all ended unsuccessfully.

The present inventors, however, studied this reaction and, as indicated in Japanese patent, patent application No. 17,797/1957 discovered that chlorinated phthalodinitriles of high quality can be obtained with high yield by a flow type, vapor-phase thermal chlorination method, which is absolutely different from the convention batch-type, liquid-phase chlorination method.

As a result of further research, the present inventors further discovered that industrially advantageous chlorinated phthalodinitriles can be obtained by carrying out the said flow type, vapor-phase thermal chlorination process catalytically.

That is, for the catalyst, the following substances may be used: alumina gel, silica gel, silica-alumina binary gel, or natural silicate clays such as kaolin, acid clay; or iron hydroxide gel, charcoal or activated carbons activated by the gas or steam-activation method or by the chemical-activation method; or animal (bone) charcoals, etc.; or a mixture of two or more of these substances; or these substances which have been made to contain, or to which have been made to adhere, one or more kinds of chlorides of alkaline metals of the first group of the periodic table or alkaline-earth metals of the second group. It was found that, if phthalodinitriles and chlorine gas are made to flow continuously in the vapor-phase over these catalysts, chlorinated phthalodinitriles of high purity will be formed at an extremely high yield.

The substances in the compositions of the abovementioned catalysts which function as the principal active constituent are; alumina gel, silica gel, silica-alumina binary gel, or natural silicate clays such as kaolin, acid clays, etc.; or iron hydroxide gel, charcoal, activated carbons, or activated charcoal; animal (bone) charcoal, etc. The chlorides of alkaline metals of the first group of the periodic table or alkaline earths of the second group mainly function as promoters or carriers.

That is, the first effect of these alkalines or the chlorides of the alkaline earths is a common effect of suppressing the occurrence of undesirable side reactions such as perchlorination-decomposition, or reactions forming substances with higher boiling points. The second effect is the suppression of sublimation of the iron chloride or aluminum chloride which are produced during the reactions with catalysts containing the iron or aluminum component. Of course, it is not absolutely necessary to add these additions in the form of chlorides. They may be added as hydroxides, inorganic salts such as carbonates, nitrates, phosphates, etc. or as salts of organic acids. These substances, during their use as catalysts in the chlorination reaction, are sooner or later changed into the corresponding chlorides.

The optimum adding quantities in which these additives are used vary with the composition of the principal activated substance, but, approximately 10% to 300% of the principal activated substance is used.

The greatest effect of using a catalyst is to increase the reaction speed and the possibility of lowering the reaction temperature, 50° C. through 200° C. below that of the vapor-phase thermal chlorination. That is, even with a reaction temperature of between 250° C. and 350° C., a sufficiently high chlorination reaction speed is obtainable. For example, if 30 grams of silica gel catalyst are used, 2.0 grams per hour of phthalodinitriles are vaporized, and 1.8 litres per hour of chlorine gas are mixed thoroughly with phthalodinitriles, and this mixture is fed over catalyst, whereby a rate of reaction of the chlorine gas of the order of 94% can be obtained at a catalyst layer temperature 350° C. In the case of vapor-phase thermal chlorination, however, the reaction rate of the chlorine gas is of the order of 65% under approximately the same conditions without the catalyst.

A catalyst which is especially effective for the tetrachlorination of phtholodinitriles is one having an activated carbon as its main activated constituent. That is, an activated carbon which has been activated by such an activation process as the steam activation process (for example activation of charcoal in excess steam at a temperature between 800° and 1,200° C.) or as the chemical activation process (for example: activation by treating with an activator such as zinc chloride or sodium sulfate) has, in itself, a considerably powerful chlorination activity in the main chlorination reaction. However, it entails a few disadvantages such as follows: a local overheating phenomenon easily occurs on the catalyst; the reaction readily progresses beyond tetrachlorination, and perchlorination (breakage of bond between the carbon atoms of the benzene nucleus and nitrile group) easily occurs; and polymerization and condensation occur, causing a considerable quantity of polymerized condensation products to settle onto the catalyst layer. The side reactions lower the yield of the chlorinated phthalodinitrile, and, moreover, the settling of the polymerized condensation products onto the catalyst results in causing variations in the catalyst activity during the reaction. It was discovered that, in order to eliminate these disadvantages and to secure a stable catalyst of the activated carbon type, treatment as described below is effective.

Before using, as the catalyst, an activated carbon type catalyst either containing or not containing chlorides of alkaline metals or of alkaline earth metals as described previously, the said catalyst is pre-treated with chlorine at a temperature which is within the limits (150° to 450° C., preferably between 200° and 350° C.) of the temperature of the main chlorination reaction, the said treatment being carried out in an excess of chlorine gas (preferably with the chlorine gas passed through thoroughly until the presence of hydrochloric acid gas is no longer detected in the exhaust gases). By this method, a catalyst which is capable of suppressing the occurrence of the polymerization and condensation reaction during the main chlorination reaction and of preventing, to a considerable degree, the phenomenon of the settling of polymerized condensation products on the catalysts is obtained.

Further, in a variation of the method, a natural silicate type clay, such as kaolin, acidic clay, etc., or silica gel or alumina gel, or one kind or a mixture of two or more kinds of such substances as the previously mentioned chlorides of alkaline metals is added to pulverized activated carbon at a ratio of 0.1 to 50 times the quantity of the said carbon; the mixture is then mixed well, formed into tablets, which are then made to undergo such a chlorine pre-treatment as described previously and used as the catalyst. In a still further variation of the method, one kind or a mixture of two or more kinds of kaolin, acidic clay, or alumina gel, silica gel, or chlorides of alkaline metals, such as those previously mentioned, is mixed with activated carbon which has undergone the previously described chlorine pre-treatment, formed, and used as the catalyst.

When such catalysts are used, since the activated carbons are sufficiently and uniformly distributed in the natural silicate type clays having high caking strength, such as kaolin and acidic clays, it is able to prevent, to a considerable degree, local overheating of the catalyst layer; and by the interrelation with the chlorination activity of kaolin, acidic clays, silica gel, alumina gel, etc., a catalyst having extremely high efficiency and high mechanical strength is obtained.

By the use of an improved, activated carbon type catalyst as described above, the chlorination reaction speed is increased, relative to that in the case where an activated carbon type catalyst before pre-treatment with chlorine is used. Consequently, the reaction temperature can be lowered somewhat, and, as a result, a product such as tetra-chlorophthalodinitrile of higher quality can be obtained at a higher yield. This improvement was confirmed by the comparative results of the following experiments.

Vaporized phthalodinitrile at a feed rate of 2.9 grams per hour, chlorine gas at 4.0 liters per hour, and hydrochloric acid gas at 3.2 liters per hour were thoroughly mixed and this mixture was fed onto 85.0 grams of an activated carbon type catalyst containing barium chloride the quantity of which is 30 percent by weight of the activated charcoal and passed through catalyst. During a three-hour reaction at a catalyst layer temperature of 340° C., 12.5 grams of chlorination products of an average degree of chlorination of 3.4 were obtained. The tetrachlorophthalodinitrile content of these chlorination products was approximately 87.5 percent by weight.

For comparison, the same catalyst, in the same quantity, as described above was pre-treated with chlorine for five hours at a temperature between 300 and 330° C. before the start of the reaction. When chlorination of the phthalodinitrile was carried out with the use of the aforementioned pre-treated catalyst and under approximately the same conditions as for the case of the untreated catalyst, 15.8 grams of chlorination products of an average degree of chlorination of 3.77 were obtained, and the tetrachlorophthalodinitrile content was more than 93.2 percent by weight.

In Table 1 are represented the experimental results, as examples, for the case wherein use is made of a representative catalyst used for vapor-phase catalytic chlorination of phthalodinitriles.

TABLE 1

*Examples of Experimental Results of the Continuous, Vapor-Phase Catalytical Chlorination of Phthalodinitriles With the Use of Various Catalysts*

| Ref. No. | Kind of Catalyst | Q'ty of catalyst used (gm.) | Temp. of catalyst (° C.) | Chlorine gas feed rate (liter/hr.) | Phthalodinitrile feed rate (gram/hr.) | Average degree of chlorination of reaction products | Melting point of reaction products (° C.) |
|---|---|---|---|---|---|---|---|
| 1 | Alumina gel, HCl treated | 80.0 | 330 | 3.7 | 2.6 | 3.4 | |
| 2 | Kaolin, HCl treated | 120 | 350 | 4.2 | 6.3 | 2.0 | |
| 3 | Acidic clay | 40 | 410 | 4.3 | 3.0 | 3.6 | |
| 4 | Wood charcoal | 45 | 330 | 6.6 | 3.85 | 1.50 | |
| 5 | Activated charcoal (steam activated) containing 30% barium chloride. | 85.0 | 340 | 4.0 | 2.9 3.2 | 3.4 | |
| 6 | Steam-activated charcoal (catalyst containing 20% kaolin, pretreated with Cl). | 82.0 | 270-290 | 6.8 | | 3.90 | 240-243 |
| 7 | Zinc-chloride-activated charcoal (catalyst containing 31% acidic clay, pre-treated with Cl). | 97 | 280-300 | 22.0 | 4.3 | 3.87 | 238-242.7 |
| 8 | Steam-activated charcoal | 62.8 | 280-300 | 22.0 | 2.43 | 3.58 | |
| 9 | Silica gel (containing 15% calcium chloride) | 54.0 | 335 | 3.4 | 2.5 | 3.07 | |
| 10 | Silica-alumina gel (1:1 weight ratio) | 50.0 | 265 | 2.0 | 3.4 | 1.85 | |

In general, if the reaction temperature becomes 240° C. or lower, the chlorination progressively becomes difficult and, at the same time the tendency of the phthalodinitrile or its chlorination products to adhere to the catalyst increases. At 200° C. or lower, the process becomes impractical. However, this lower limit of the reaction temperature can be lowered further by approximately 20 to 30° C. by considerably increasing the quantity of the diluent (to be described later) used (for example, hydrochloric acid gas of a quantity five or more times the theoretical quantity of chlorine gas used in the reaction), or by using such a catalyst to which adhering of the phthalodinitrile or its chlorination products is difficult as the previously described activated carbon type catalysts which have been pre-treated with chlorine.

In general, with increase in the reaction temperature, the reaction speed increases, but the occurrence of side reactions, particularly chlorination decomposition, that is, the reaction wherein the nitrile group of the phthalodinitrile is substituted by the chlorine atom, becomes intense, and the formation of such products as chloro-benzonitrile etc. becomes appreciable. Therefore, it may be assumed that temperatures near 450° C. are the upper limit of the reaction temperature.

The catalytic chlorination reaction of phthalodinitriles causes an intense generation of heat if the catalyst activity is strong or if the reaction temperature is high, with the accompaniment of local temperature vise in the catalyst, causing the occurrence of side reactions. However, these undesirable results can be prevented by simultaneously circulating or feeding together with the chlorine gas and starting material phthalodinitrile, an inert gas such as nitrogen gas or carbon dioxide gas, an excess of hydrochloric acid gas, chlorinated hydrocarbons such as carbon tetrachloride or chlorinated benzenes, which are relatively stable in the main chlorination reaction, or such gases as hydrogen chloride gas which are formed in the main chlorination reaction. Furthermore, even when the reaction temperature is sufficiently low, use of an excess of the previously mentioned diluent will facilitate the maintenance of the vapor phase of the starting materials which have not yet reacted or the chlorinated phthalodinitrile. Consequently, it will be possible to lower the lower limit of the reaction temperature by approximately 20 to 30° C. as compared with that when a diluent is not used.

The relative quantity of chlorine to be used can be varied at will depending on the desired degree of chlorination of the chlorinated phthalodinitrile sought. In many cases, a quantity between the theoretical value and 1.5 times the said value is sufficient. The method of using several times, several tens of times, or more times the said theoretical value, conducting the reaction with a high space velocity, and recirculating the unreacted chlorine gas can also be utilized. However, when the excess quantity of chlorine gas used exceeds the quantity required for tetrachlorination, and if the reaction temperature is unnecessarily high, the formation of products, such as hexa-chlorobenzene, of perchlorination side reaction due to perchlorination decomposition will increase; and if the space velocity is unsuitable, local overheating of the catalyst will occur, the same kind of side reaction will take place and may become a cause of the lowering of the catalyst activity or the shortening of the catalyst life.

The compositions of the phthalodinitrile chlorination products obtained by the vapor-phase, catalytic process, such as that described previously, for chlorinating phthalodinitriles are determined by the kind of catalyst and reaction conditions, but the said products are mixtures of two or more kinds of the unreacted phthalodinitrile and chlorinated phthalodinitrile containing from 1 to 4 chlorine atoms, and constituting the principal constituent.

Although it is possible to obtain chlorinated phthalocyanine by using the aforementioned mixture of chlorinated phthalodinitriles as it exists, chlorinated phthalocyanine of much higher quality can be obtained from pure chlorinated phthalodinitrile in which is retained a specified number of chlorine atoms. For example, chlorinated phthalocyanine in which is retained 16 chlorine atoms on a structure of a benzene nucleus is obtained from tetrachlorophthalodinitrile containing 4 chlorine atoms; and this substance is extremely superior as a green organic pigment.

Hitherto, absolutely nothing has been known about a method whereby tetra-chloro-phthalodinitrile is selectively separated from a mixture of phthalodinitrile and low-grade chlorinated phthalodinitrile and refined. The present inventors have conducted intensive research on the processes of separating and refining chlorinated phthalodinitriles obtained from the chlorination reaction, as a result of which the present inventors have discovered a method of selectively separating tetra-chlorophthalodinitrile from a mixture of chlorinated phthalodinitrile either containing or not containing phthalodinitrile and a method of refining the product to a high degree of purity.

As methods of separating and refining chlorinated phthalodinitriles containing one to four atoms of chlorine, such methods as the distillation method, reduced-pressure sublimation method, and the method of extraction by means of organic solvents can be thought of. According to the research conducted by the present inventors, however, chlorine substitution products have substantially higher boiling points than phthalodinitrile (phthalodinitrile at normal pressure has a boiling point of approximately 297–300° C.). Furthermore, all of these products have substantially high melting points. (As examples, the melting point of phthalodinitrile is 138–139.5° C.; that of 4.5-dichlorophthalodinitrile is 178° C.; that of 3.6-dichlorophthalodinitrile is 168° C.; and that of tetra-chlorophthalodinitrile is 243.5–244° C.) Moreover, when these substances are heated to their melting points or higher, polymerized condensation products are easily formed as in the case of phthalodinitrile. It was discovered that because of these reasons, the use of the distillation method is considerably difficult. The use of the sublimation method was further judged to be difficult because of such reasons as that of all of the said substances having strong sublimation characteristic of about the same degree regardless of the presence or absence of chlorine atoms or their number. However, as a result of an intensive study by the present inventors of the method of carrying out separation and refining of a mixture of chlorinated phthalodinitriles through the utilization of the differences in solubility with respect to organic solvents, it was discovered that it is possible to separate tetra-chloro-phthalodinitrile selectively and with high efficiency from the other chlorinated phthalodinitriles and unreacted substances. To be explicit, the present inventors first measured the solubilities of various kinds of chlorinated phthalodinitriles and unreacted phthalodinitrile in a great number of organic solvents. Hithereto, there has been almost no data on these matters. As an unexpected result, a remarkable new fact was discovered, that is, in comparison with other chlorinated phthalodinitriles of lower chlorination degrees and unreacted phthalodinitrile, tetra-chlorophthalodinitrile has lower solubility in such organic solvents as ketones, alcohols, aromatic hydrocarbons, esters, nitriles, hydrocarbon halides, ethers, and petroleum hydrocarbons. Representative examples of these measurements are indicated in Table 2.

TABLE 2

*Solubilities of Phthalodinitrile and Various Chlorine-Substituted Products of Phthalodinitrile in Organic Solvents*

[At normal temperature and pressure]
(Explanation of symbols)

– – – Extremely low solubility    + Soluble
– – Low solubility    + + Easily soluble
– Slightly soluble    + + + Extremely soluble

| Kind of organic solvent | Kind of measurement comparison substance | | |
|---|---|---|---|
| | Phthalo-dinitrile | Mono or Dichloro-product | Tetra-chloro-product |
| Ketones— | | | |
| Acetone | +++ | +++ | + |
| Methyl-ethyl ketone | +++ | +++ | + |
| Aromatic Hydrocarbons— | | | |
| Benzene | +++ | +++ | + |
| P-xylene | +++ | +++ | + |
| Alcohols— | | | |
| Methyl alcohol | ++ | + | – – – |
| Ethyl alcohol | ++ | ++ | – – |
| Isopropyl alcohol | ++ | ++ | – – |
| n-Butyl alcohol | ++ | + | – – – |
| Isobutyl alcohol | ++ | + | – – |
| Tert-amyl alcohol | ++ | + | – – |
| Esters— | | | |
| Ethyl acetate | +++ | ++ | + |
| Butyl acetate | +++ | ++ | + |
| Nitriles— | | | |
| Acetonitrile | +++ | ++ | + |
| Hydrocarbon Halides— | | | |
| Carbon tetrachloride | + | + | – – – |
| Trichloroethylene | ++ | + | – – |
| Ethylene dibromide | ++ | + | – – |
| Trichlorobenzene | ++ | + | – |
| Ethers: | | | |
| Diethyl ether | + | + | – – – |
| Dioxane | +++ | +++ | + |
| Isopropyl ether | ++ | ++ | – – |
| Petroleum Hydrocarbons— | | | |
| n-Heptane | + | – – | – – – |
| Cyclohexane-cyclohexanone (volume ratio, 1:1) | ++ | + | – |

NOTE.—Representative examples of relative solubilities (at normal temperature and pressure) of phthalodinitrile and tetra-chloro-phthalodinitrile in the same solvents are as follows: Acetone, 3:1 approx.; benzene, 3:1 approx.; methyl alcohol, 12:1 or higher; butyl acetate, 3:1 approx.; carbon tetrachloride, 10:1 or higher; isopropyl ether, 8:1 or higher; n-heptane, 14:1 or higher.

As can be readily inferred from the foregoing table, by washing, extraction treatment, or recrystallization treatment of a mixture comprising arbitrary proportions of chlorinated phthalodinitriles of lower chlorination degrees, containing or not containing unreacted phthalodinitrile, and tetra-chloro-phthalodinitrile obtained from chlorination of phthalodinitrile with one organic solvent or a mixture of two or more organic solvents such as represented in the above-mentioned Table 2, for example, aromatic hydrocarbons such as benzene and p-xylene; alcohols such as methyl alcohol, ethyl alcohol, isopropyl alcohol, butyl alcohol, and amyl alcohol; ketones such as acetone and methylethyl ketone; hydrocarbon halides such as carbon tetrachloride, trichloroethylene, ethylene bromide, and trichlorobenzene; ethers such as diethyl ether, isopropyl ether, and dioxane; esters such as ethyl acetate and butyl acetate; nitriles such as acetonitrile; and petroleum hydrocarbons such as n-heptane, it is possible to recover tetrachlorophthalodinitrile of high purity and at a high yield as washing residue, extraction residue, or crystallization product (provided that the tetrachlorophthalodinitrile content is not extremely low). Simultaneously, unreacted products and low-grade chlorinated phthalodinitriles of lower chlorination degrees containing little or no tetrachlorophthalodinitrile can be recovered from the mother liquor side at a high yield.

As is further apparent from Table 2, in such solvents as alcohols such as methyl alcohol, ethyl alcohol, isopropyl alcohol, n-butyl alcohol, isobutyl alcohol, and amyl alcohol; hydrocarbon halides such as carbon tetrachloride, trichloroethylene, and ethylene bromide; or ethers such as diethyl ether and isopropyl ether the relative solubility of tetrachlorophthalodinitrile is particularly low (for example, the relative solubility ratio of phthalodinitrile and tetrachlorophthalodinitrile in methyl alcohol near normal pressure and temperature is 12:1 or higher), and it can be said that these solvents are particularly superior.

As the organic solvent to be used for the recovery of tetrachlorophthalodinitrile, which is contained among the products of vapor-phase, catalytic reaction of phthalodinitriles, solvents other than those indicated as examples may be used, for the most part, in the same manner provided that they are compounds belonging to the aforementioned groups of aromatic hydrocarbons, alcohols, hydrocarbon halides, ketones, esters, ethers, nitriles, and petroleum hydrocarbons. However, solvents with boiling points between normal temperatures and approximately 230° C. are desireable, with particular preference going to those having boiling points between 50 and 130° C., approximately from consideration such factors as ease of being dirtied, heat economy of solvent recovery, and ease of operation.

The conditions of treatment such as kind of solvent, quantities used, treatment temperature, and number of cycles during washing, extraction, or recrystallization by means of an organic solvent such as that described previously are to be determined by such factors as the solubility in the solvent of tetrachlorophthalodinitrile or other chlorine-substituted products of phthalodinitrile; the requirements for product purity; and thermal economy of solvent recovery and other economic considerations. These conditions can be suitably determined in accordance with common technological knowledge of general organic chemistry.

The temperatures at which the solvents are to be used are determined suitably within the ranges in which the solvents can be maintained in the liquid state. In most cases, however, the objects can be amply accomplished at temperatures between normal room temperature and approximately 80° C. With solvent quantities to be used within the range of from one to approximately 50 times the weight of the substance to be treated, the objects of separation and refining can be accomplished for the most part. From the point of product purity, the recrystallization method is the best, but the objects can be accomplished fully by also the washing or method of extraction treatment of solid samples. In this case, it is desirable to have the samples ground to as fine particles as possible. The solvents in this separation refining method can be recovered almost completely by the distillation method and, therefore, can be used by recirculation. Moreover, during this process, the mixture of chlorinated phthalodinitriles of lower chlorination degrees obtained from the mother liquor side can be used as a starting material for the manufacture of chlorinated phthalocyanines of lower chlorination degrees.

The following examples of actual application of this invention illustrate the process thereof. It is, of course, to be understood that these examples are only illustrative and are not intended to limit the scope of the invention. In all the examples was used the same reaction apparatus as in the case of the Example 1.

EXAMPLE 1

Alumina gel prepared by the method of adding aluminum nitrate to ammonia water was dried well at 105° C., then pulverized to approximately 6 to 8 mesh size. This was steeped in 5% hydrochloric acid then redried. 2.6 grams per hour of vaporized phthalodinitrile and 3.7 liters per hour of chlorine gas were mixed well and then this mixture was fed on 80.0 grams of this redried alumina gel catalyst settled in a vertical glass tube reactor of 3.0 cm. diameter which is fixed in an electrical heating furnace, whereby the reaction was caused to take place for three hours with a catalyst layer temperature of 330° C. The reaction products were sublimed into the product acceptor combined with one end of the reactor, while being accompanied with the exhaust gas such as unreacted chlorine gas, hydrochloric acid gas and other etc. During this process, 14.0 grams of chlorinated phthalodinitrile of a degree of chlorination of 3.4 were obtained.

EXAMPLE 2

3-normal sulfuric acid was agitated as it was ice-cooled, and to this was added 3-normal, water glass solution (mole ratio of Na$_2$O to SiO$_2$, 1 to 2). The mixture was left standing overnight; then the gel was washed with water, filtered, dried at 105° C., pulverized to approximately 10–12 mesh size, and steeped in a calcium chloride solution containing CaCl$_2$ the quantity of which is approximately 12.0 percent by weight of the silica gel, and all the moisture content was dried out. 1.3 grams per hour of vaporized phthalodinitrile, 1.35 litres per hour of chlorine gas, and 1.0 liter per hour of nitrogen gas were mixed well and this mixture was fed on 36.0 grams of the resulting silica gel catalyst, with calcium chloride made to adhere thereto to carry out the reaction for 4 hours with a catalyst layer temperature of 305° C. During this reaction, a rate of reaction of chlorine gas of 89.5 percent was attained, and 9.0 grams of chlorinated phthalodinitrile of degree of chlorination of 3.1 were obtained.

EXAMPLE 3

Kaolin was steeped in dilute hydrochloric acid aqueous solution of iron chloride the quantity of which, as iron hydroxide, is 24.0 percent by weight of the kaolin, and ammonia water was added to produce iron hydroxide gel. The resulting product was then filtered, water-washed, dried, and pulverized to 8–10 mesh size. 6.3 grams per hour of vaporized phthalodinitrile and 4.2 liters per hour of chlorine gas were mixed well and then this mixture was fed on 120 grams of said kaolin-iron-hydroxide gel catalyst to carry out the reaction on the catalyst and to lead out the reaction products while having been passed along the catalyst. Then, during a 4-hour reaction at a catalyst layer temperature of 350° C., a rate of reaction of chlorine gas of 78 percent was attained, and 35.4 grams of chlorinated phthalodinitrile of degree of chlorination of 2.0 were obtained.

EXAMPLE 4

3.0 grams per hour of vaporized phthalodinitrile and 4.3 liters per hour of chlorine gas were mixed well and this mixture was fed on 40.0 grams of acid clay catalyst of approximately 6–8 mesh fineness to carry out the reaction for 4 hours at a catalyst layer temperature of 410° C., during which a rate of reaction of chlorine gas of 94.6 percent was attained, and 20.5 grams of chlorinated phthalodinitrile of degree of chlorination of 3.6 were obtained.

EXAMPLE 5

An activated carbon catalyst was prepared by steeping activated charcoal of 8–10 mesh fineness in an aqueous solution of barium chloride corresponding to 30.0 percent by weight with respect to the activated charcoal and evaporating the resulting product to dryness. 2.9 grams per hour of vaporized phthalodinitrile, 4.0 liters per hour of chlorine gas, and 3.2 liters per hour of hydrochloric acid gas were mixed well and this mixture was fed on 85.0 grams of the above-mentioned catalyst to carry out the reaction for 3 hours at a catalyst layer temperature of 340° C. During this reaction, a rate of reaction of chlorine gas of 93.8 percent was attained, and 12.5 grams of chlorinated phthalodinitrile of degree of chlorination of 3.4 were obtained.

EXAMPLE 6

100 parts of fine particles of activated charcoal activated by passing an excess of steam at a temperature of 950° C. through wood charcoal for 4 hours were mixed thoroughly with 20 parts of finely pulverized kaolin (approximately 200 mesh). A minimum quantity of water sufficient for kneading together was added, and the mixture was further kneaded amply well and mixed and pressformed into tablets, each of cylindrical shape approximately 5 millimeters in outside diameter and 3–4 millimeters in length. This catalyst was treated by passing on it an excess of chlorine gas at a temperature of 320° C. for 4.5 hours. On 82.0 grams of this pretreated, activated carbon-kaolin catalyst, was fed the mixture prepared by mixing well 3.2 grams per hour of vaporized phthalodinitrile, 6.8 liters per hour of chlorine gas, and 1.2–1.5 liters per hour (recirculation rate) of a portion of the hydrochloric acid gas generated in the reaction. When reaction was caused to take place for 4 hours with a catalyst layer temperature of 270–290° C., 24.8 grams of chlorinated phthalodinitrile of average degree of chlorination of 3.90 and melting point of 240–243° C. were obtained. It was determined by the chromatographic analysis method that the products of reaction contained approximately 95.2 percent by weight of tetrachlorophthalodinitrile.

EXAMPLE 7

100 parts of finely pulverized activated charcoal activated by the zinc chloride activation method was mixed well with 31 parts of finely pulverized acidic clay. To this mixture was added a minimum quanity of water sufficient for kneading together, and the mixture was further mixed and kneaded together amply well and, in a manner similar to that in Example 6, the mixture was chlorine treated for 4.5 hours at a temperature of 340° C. 4.3 grams per hour of vaporized phthalodinitrile and 22.0 liters per hour of chlorine gas were mixed well and this mixture was fed on 97 grams of the above-mentioned activated carbon-acidic clay catalyst. When reaction was caused to take place of 3.5 hours at a catalyst layer temperature of 280–300° C., 28.8 grams of chlorinated phthalodinitrile of average degree of chlorination of 3.87 and melting point of 238–242.7° C. were obtained, and the tetrachlorophthalodinitrile content was approximately 94.8 percent by weight.

EXAMPLE 8

100 parts of finely pulverized powder of an activated carbon obtained by activating wood charcoal with an excess of steam at a temperature of 850° C. for 5 hours, similarly as in Example 6, and 3 parts of barium chloride were dissolved in water to make an aqueous solution. With the addition of water similarly as in Example 6, 15 parts of finely pulverized kaolin were mixed thoroughly and uniformly with the said solution and formed into tablets of approximately the same size as described in Example 6. The said tablets were chlorine treated well in an excess of chlorine gas for 6 hour at a temperature of 230–270° C. On 73.5 grams of the activated carbon-barium chloride-kaolin catalyst thus prepared was fed the mixture prepared by mixing well 2.85 grams per hour of vaporized phthalodinitrile, 3.2 liters per hour of chlorine gas, and a portion, 1.8 liters per hour or more, of hydrochloric acid gas generated in the reaction. When reaction was caused to take place for 5 hours at a catalyst layer temperature of 275–290° C., 27.7 grams of chlorinated phthalodinitrile with an average degree of chlorination of 3.92 and a tetrachlorophthalodinitrile content of 96.3 percent by weight were obtained.

EXAMPLE 9

Activated charcoal which had been activated by the method of Example 6 was, similarly as in Example 6, thoroughly treated by chlorine gas for 4.5 hours at a temperature of 330–350° C. On 58.0 grams of the activated charcoal catalyst thus prepared was fed the mixture prepared by mixing well 2.2 grams per hour of vaporized phthalodinitrile, 1.37 liters per hour of chlorine gas, and 8.0 liters per hour of circulating nitrogen gas. When reaction was caused to take place for 4 hours at a catalyst layer temperature of 185–195° C. 11.5 grams of chlorinated phthalodinitrile with an average degree of chlorination of 1.54 and a monochlorophthalodinitrile content of approximately 35 percent by weight were obtained.

EXAMPLE 10

100 parts of the activated charcoal obtained in Example 9 in finely pulverized form, 15 parts of finely pulverized kaolin, 5.4 parts of finely pulverized acidic clay, and 3.1 parts of finely pulverized alumina gel were thoroughly mixed. Water sufficient for kneading was added to this mixture, which was then further mixed and kneaded together and formed into tablets of the same size as that of Example 6. On 92.5 grams of the activated carbon-kaolin-acidic clay-alumina gel catalyst thus prepared was fed the mixture prepared by mixing well, 2.7 grams per hour of vaporized phthalodinitrile, 3.8 liters per hour of chlorine gas, and 2.5 liters per hour of carbon tetrachloride gas. When reaction was caused to take place for 3 hours at a catalyst layer temperature of 265–280° C., 15.2 grams of chlorinated phthalodinitrile with an average degree of chlorination or 3.91, a melting point of 241.1–243.3° C., and a tetrachlorophthalodinitrile content of 96.1 percent by weight were obtained.

EXAMPLE 11

By a steeping method conforming to that in Example 2, 15.0 percent by weight of barium chloride was caused to adhere to the silica gel prepared as in Example 2. On 54.0 grams of the silica-gel catalyst thus prepared was fed the mixture prepared by mixing well 2.5 grams per hour of vaporized phthalodinitrile, 3.4 liters per hour of chlorine gas, and 2.5 liters per hour of carbon tetrachloride gas. During the reaction of 3 hours at a catalyst layer temperature of 335° C., 11.7 grams of chlorinated phthalodinitrile with a degree of chlorination of 3.07 were obtained.

EXAMPLE 12

Similarly as in Example 5, to wood charcoal of approximately 6–8 mesh fineness, 10.0 percent by weight, with respect to the wood charcoal, of sodium chloride and 8.0 percent by weight, with respect to the wood charcoal, of calcium chloride were made to adhere by the steeping method. On 55.6 grams of the wood charcoal catalyst thus prepared was fed the mixture prepared by mixing well 1.1 grams per hour of phthalodinitrile and 1.4 liters per hour of chlorine gas. During the reaction for 4 hours at a catalyst layer temperature of 365° C., a rate of reaction of chlorine gas of 94.6 percent was attained, and 7.6 grams of chlorinated phthalodinitrile of a degree of chlorination of 3.88 were obtained.

EXAMPLE 13

The alumina gel and silica gel prepared by the methods of Examples 1 and 2 were mixed thoroughly in their undried condition at a weight ratio of 1:1 and then dried at 105° C. On 50.0 grams of the silica-alumina, binary gel catalyst thus prepared was fed the mixture prepared by mixing well 3.4 grams per hour of vaporized phthalodinitrile and 2.0 liters per hour of chlorine gas. During the reaction for 3 hours at a catalyst layer temperature of 265° C., a rate of reaction of chlorine gas of 93.0 percent was attained, and 14.8 grams of chlorinated phthalodinitrile of a degree of chlorination of 1.85 were obtained.

EXAMPLE 14

10.0 grams of finely pulverized powder of a mixture comprising 75.0 percent by weight of tetrachlorophthalodinitrile and 25.0 percent by weight of a mixture of mono-through-trichlorophthalodinitriles were placed in a flask of 200 cubic centimeter inside capacity; 80 cc. of ethyl alcohol were added; the contents were shaken well at normal (room) temperature; and the insoluble substances were strained out on a filter paper. At normal temperature, further washing with ethyl alcohol, four times with 10 cc. each time, was carried out, and the recovery rate for tetrachlorophthalodinitrile was 96.0 percent.

EXAMPLE 15

2.5 grams of finely pulverized powder of a mixture comprising 80.0 weight percent of tetrachlorophthalodinitrile and 20.0 weight percent of a mixture of mono- and dichlorophthalodinitriles and unreacted phthalodinitriles were placed in a flask of 100 cc. inside capacity; 25 cc. of isopropyl ether were added; the contents were shaken well at room temperature; and the insoluble substances were strained out on a filter paper. At room temperature, further washing with isopropyl ether, three times with 2.5 cc. each time, was carried out, and the rate of recovery of tetrachlorophthalodinitrile was 96.3 percent.

EXAMPLE 16

Under the reaction conditions comprising the use of 130 grams of an activated charcoal catalyst containing 20 percent of barium chloride; a reaction temperature between 240 and 290° C.; feed rate of phthalodinitrile of 4.57 grams per hour; and feed rate of chlorine gas of 19.8 liters per hour, a portion of the hydrochloric acid gas generated was taken out, and the remainder was returned once again to the reaction system together with the unreacted chlorine gas. With this recirculation, the reaction during 3.5 hours produced 28.4 grams of reaction products of average degree of chlorination of 3.61.

25.0 grams of pulverized powder of the aforementioned reaction products were placed in a 500 cc. flask; 140 cc. of methyl alcohol were added; and a reflux condenser was used, and the mixture was once boiled and left to cool to room temperature. Then the insoluble substances and the separating crystals were strained out on a glass filter. The substances on the filter were further washed, four times with 10 cc. of methyl alcohol each time, at room temperature, and 21.2 grams of tetrachlorophthalodinitrile (melting point as measured, 242.6–243.7° C.; and chlorine content as measured, 98.9 percent of theoretical) were obtained.

EXAMPLE 17

Vapor-phase, continuous, catalytic chlorination of phthalodinitrile was carried for 4 hours under reaction conditions comprising the use, as catalyst, of 62.8 grams of pine charcoal treated with high temperature steam; reaction temperature of 200° C.; phthalodinitrile feed rate of 2.3 grams per hour; chlorine gas feed rate of 1.4 liters per hour; and circulation flow rate of circulating nitrogen gas of 9.7 liters per hour. As a result, 11.6 grams of chlorinated phthalodinitrile of average degree of chlorination of 1.60 were obtained. By the chromatographic analysis method, it was confirmed that approximately 21.0 weight percent of tetrachlorophthalodinitrile was contained among the reaction products. 4.0 gram of these reaction products were pulverized in a mortar, placed in a separating funnel, and 70 cc. of trichloroethylene were added. The mixture was shaken well at room temperature; and the undissolved substances were further washed at room temperature on filter paper with trichloroethylene, three times with 8 cc. each time. As a result, 0.74 gram of tetrachlorophthalodinitrile of melting point of 242.0–243.6° C. and chlorine content of 98.96 percent of the theoretical were obtained.

EXAMPLE 18

A pulverized mixture containing 30.0 grams of tetrachlorophthalodinitrile (melting point, 243.0–244.0° C.; and chlorine content, 99.2 percent of theoretical) and 9.82 grams of chlorinated phthalodinitriles (average degree of chlorination of 2.08) containing no tetrachlorophthalodinitrile were placed in a flask (capacity, 600 cc.); 400 cc. of carbon tetrachloride were added; the flask was shaken well; then the contents were heated to a temperature of 55° C. and left to cool to 30° C. Then the undissolved substances were strained out on filter paper, on which the undissolved substances were further washed at 25° C., five times with 18 cc. each time of carbon tetrachloride. As a result, 27.9 grams of tetrachlorophthalodinitrile of melting point of 243.2–243.9° C. and chlorine content of 99.5 percent of the theoretical were obtained.

EXAMPLE 19

When 10.5 grams of the tetrachlorophthalodinitrile obtained in Example 18 were washed at room temperature five times with 10 cc. each time of isobutyl alcohol (on filter paper), 9.88 grams of tetrachlorophthalodinitrile of melting point of 243.4–244.1° C. and chlorine content of 99.56 percent of the theoretical were obtained.

EXAMPLE 20

25.5 grams of products of the thermal chlorination reaction of phthalodinitrile (the said products of reaction being confirmed by the chromatographic analysis method to comprise 19.7 grams of tetrachlorophthalodinitrile; 4.9 grams of chlorinated phthalodinitriles other than tetrachlorophthalodinitrile; and 0.9 gram of perchlorinated products such as hexachlorobenzene having no nitrile radical) were placed in a beaker of 500 cc. capacity in conformity with the method of Example 16. 300 cc. of carbon tetrachloride were added to the mixture, and by using reflux condenser, the mixture was once boiled, then left to cool to a temperature of approximately 28° C. When the resulting undissolved substances and separating crystals were strained out, then, at 25° C., further washed two times with 20 cc. each time of methyl alcohol, 17.9 grams of tetrachlorophthalodinitrile (melting point of 242.8–243.6° C. and chlorine content of 98.6 percent of the theoretical) were obtained.

EXAMPLE 21

When 8.0 grams of the tetrachlorophthalodinitrile obtained in Example 20 were washed at room temperature three times with 15 cc. each time of isopropyl alcohol, 7.35 grams of tetrachlorophthalodinitrile of melting point of 243.4–244.2° C. and chlorine content of 99.48 percent of the theoretical were obtained.

EXAMPLE 22

When 8.0 grams of the tetrachlorophthalodinitrile obtained in Example 20 was washed with n-butyl alcohol by the same method as in Example 21, 7.37 grams of tetrachlorophthalodinitrile of melting point of 243.3–244.1° C. and cholrine content of 99.46 percent of the theoretical were obtained.

EXAMPLE 23

13.0 grams of pulverized powder of the chlorinated phthalodinitrile obtained in Example 16 were placed in a beaker (capacity 200 cc.). 52 grams of benzene were added to this. By the use of a reflux condenser, the mixture was boiled, and after complete dissolving, was left to cool to room temperature. When the separating crystals were strained out, 10.2 grams of tetrachlorophthalodinitrile (melting point of 243.6–244.3° C. and chlorine content of 99.42 percent of the theoretical) were obtained.

EXAMPLE 24

21.5 grams of crude tetrachlorophthalodinitrile of 94.5 percent purity was, by a method similar to that of Example 16, heated to a temperature of 70° C. with the use of 280 cc. of a mixed solvent comprising cyclohexane and cyclohexanone (volumetric ratio of 1:2) and left to cool to approximately 26° C. The separating crystals and undissolved substances were strained out and further washed, at 26° C., three times with 15 cc. each time of the same mixed solvent. As a result, 15.8 grams of tetrachlorophthalodinitrile of melting point of 242.1–243.3° C. and chlorine content of 98.7 percent of the theoretical were obtained.

EXAMPLE 25

14.7 grams of crude tetrachlorophthalodinitrile of 92.8 percent purity, in finely pulverized form, were placed in a beaker of 200 cc. capacity, and 105 cc. of carbon tetrachloride were added thereto. The mixture was boiled in conformity, with the method of Example 16, and left to cool to a temperature of 40° C. The crystals separating out and the undissolved substances were strained out and further washed, at a temperature of 410° C., three times with 10 cc. each time of carbon tetrachloride. As a result 9.88 grams of tetrachlorophthalodinitrile of melting point of 243.3–244.2° C. and chlorine content of 99.35 percent of the theoretical were obtained.

EXAMPLE 26

9.7 grams of fine powder of the crude tetrachlorophthalodinitrile of 92.8 percent purity used in Example 25 were placed in a 200 cc. capacity beaker in conformity with method of Example 23 and 117 cc. of trichloroethylene were added thereto. The mixture was boiled with use of a reflux condenser. Then after complete dissolving, the solution was left to cool to a temperature of 16° C. When the separating crystals were strained out, 7.8 grams of tetrachlorophthalodinitrile of melting point of 243.4–244.2° C. and chlorine content of 99.51 percent of the theoretical were obtained.

Since it is obvious that many changes and modifications can be made in the above described details without departing from the nature and spirit of the invention, it is to be understood that the invention is not to be limited to the details described herein except as set forth in the appended claims.

We claim:

1. A process for the production of tetrachlorophthalodinitrile, comprising the steps of mixing o-phthalodinitrile in the vapor phase and chlorine gas at quantities of about one part o-phthalodinitrile to between about 1.35 liters to about 22 liters of chlorine gas, and then making said mixture pass, in the vapor phase over an activated carbon catalyst maintained at a temperature of between 200° C. and 450° C. so as to chlorinate said o-phthalodinitrile, attaching four chlorine atoms to the benzene nucleus.

2. A process according to claim 1, wherein material selected from the group consisting of potassium chloride, barium chloride, calcium chloride, kaolin and acidic clay is added to said activated carbon.

3. A process according to claim 1 wherein material selected from the group consisting of nitrogen gas, hydrogen chloride, and carbon tetrachloride gas is added to the reaction zone.

4. A process according to claim 1 including the steps of purification of the crude tetrachlorophthalodinitrile reaction product which comprises inserting said crude product into material selected from the group consisting of methanol and benzene and selectively separating the lower chlorinated phthalodinitriles and unreacted o-phthalodinitriles from tetrachlorphthalodinitrile according to the difference of their solubilities in said material.

5. A process for the production of tetrachlorophthalodinitrile as claimed in claim 1, wherein material selected from the group consisting of potassium chloride, barium chloride, calcium chloride, kaolin and acidic clay is added to said activated carbon, and, material selected from the group consisting of nitrogen gas, hydrogen chloride, and carbon tetrachloride gas is added to the reaction zone.

References Cited in the file of this patent

UNITED STATES PATENTS

| | | |
|---|---|---|
| 2,231,363 | Long | Feb. 11, 1941 |
| 2,525,621 | Scalera et al. | Oct. 10, 1950 |

OTHER REFERENCES

Berkman et al.: Catalysis, 1940, pages 915–916.

Groggins: Unit Processes in Organic Synthesis, 1952, pages 207–210.

Ohta et al.: Chem. Abstracts, 1959, vol. 53, p. 9105.